United States Patent [19]

Wu et al.

[11] Patent Number: 5,044,258
[45] Date of Patent: Sep. 3, 1991

[54] MOTOR-DRIVEN CAR WINDOW FAN ASSEMBLY

[76] Inventors: Shih-Jang Wu; Hsu H. Chih; Paul Liao; Shun C. Huang, all of 9 Fl., No. 45, An Tung St., Taipei, Taiwan

[21] Appl. No.: 536,512

[22] Filed: Jun. 12, 1990

[51] Int. Cl.$^5$ .............................................. B60H 1/26
[52] U.S. Cl. ...................... 98/2.02; 98/2.13; 98/116
[58] Field of Search ................ 98/2.02, 2.12, 2.13, 98/116, 900

[56] References Cited

U.S. PATENT DOCUMENTS

| | | | |
|---|---|---|---|
| 1,792,514 | 2/1931 | Spear | 98/116 |
| 2,683,407 | 7/1954 | Takach | 98/2.02 |
| 4,738,190 | 4/1988 | Sheu | 98/116 |
| 4,893,550 | 1/1990 | Cheng | 98/2.02 |
| 4,899,645 | 2/1990 | Wolfe et al. | 98/2.02 |

FOREIGN PATENT DOCUMENTS 142392  5/1902  Fed. Rep. of Germany ........ 98/116

*Primary Examiner*—Harold Joyce
*Attorney, Agent, or Firm*—Fitch, Even, Tabin & Flannery

[57] ABSTRACT

A motor-driven, window mounted portable fan with cigarette-lighter plug. The fan, or impeller, is mounted in an impeller housing which in turn is mounted centrally on one face of a window prop. The window prop is rectangular in shape and has lengthwise slideways on both of its sides. Extension pieces fit in the slideways so that the slideways can be lengthened to fit different sized windows. Opposite the impeller housing is a rain cover and a vent lid, which covers a vent. The vent lid is opened and closed by a motor, via an activation arm.

1 Claim, 4 Drawing Sheets

MOTOR-DRIVEN CAR WINDOW FAN ASSEMBLY

BACKGROUND OF THE INVENTION

The present invention relates generally to car fans and in particular relates to a motor-driven car window fan assembly which plugs into the cigarette lighter of the car.

In the past, some cars came equipped with built-in fans and some didn't. In those cars which were equipped with fans the fan often could not be turned on unless the car ignition was activated. Therefore, if the user desired to leave the fan on for a short time while not in the car, then the keys had to be left in the car, obviously an undesirable predicament because of security considerations. Other cars may not be equipped with fans. In that case, it would be desirable to have an insertable fan (such as a window fan) which could be added by the user at any time.

FIGS. 4 and 5 show two different views of a conventional solar-powered car window fan. A solar fan has the obvious limitation that when there is not enough sunlight, the fan will not work. Furthermore, the air inlet remains permanently open, thereby allowing air and/or rain to enter into the car when the fan is not in use.

SUMMARY OF THE INVENTION

It is a primary objective of the present invention to provide a portable fan which is mountable in a car window.

It is another objective of the present invention to provide such a portable car window fan in which the vent can be remotely opened and closed as desired.

It is still another objective of the present invention to provide such a portable car window fan which can be plugged in to an ordinary car cigarette lighter.

Further objectives and advantages of the present invention will become apparent as the following description proceeds, and the features of novelty which characterize the invention will be pointed out with particularity in the claims annexed to and forming a part of this invention.

DETAILED DESCRIPTION OF THE PREFERRED EMBODIMENT

Figure 1:
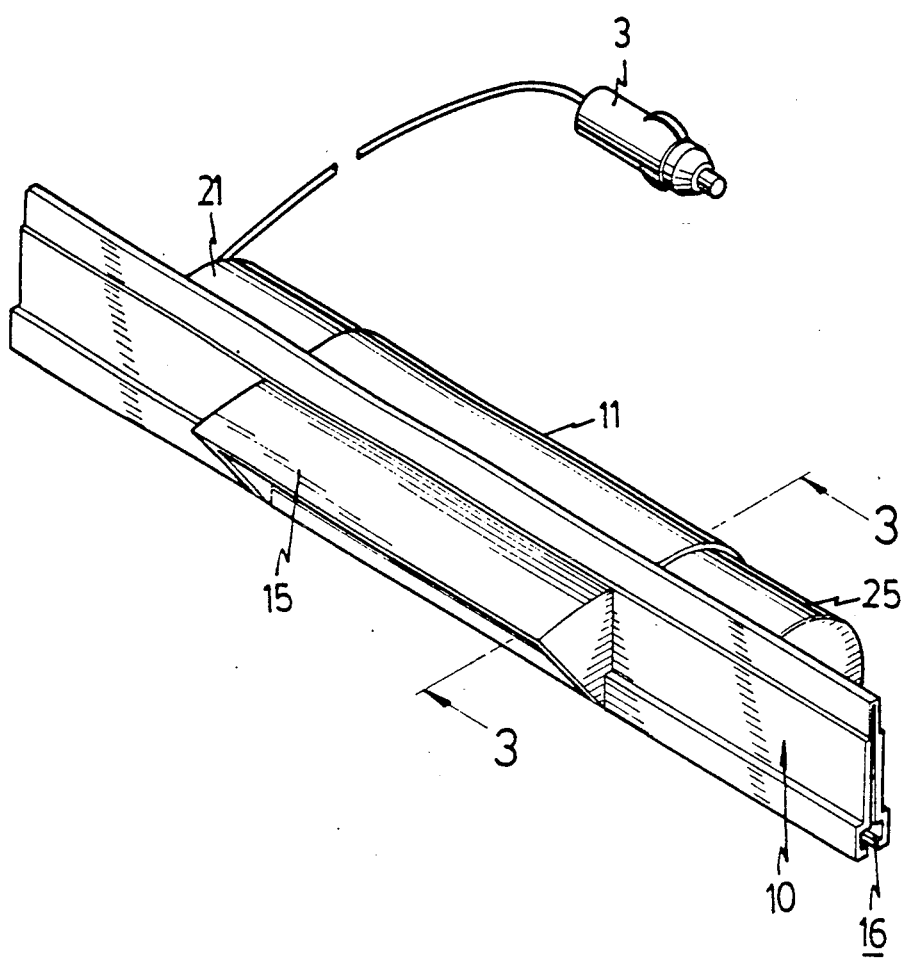
FIG. 1 is a perspective view of the car window fan assembly of the present invention.
Figure 2:
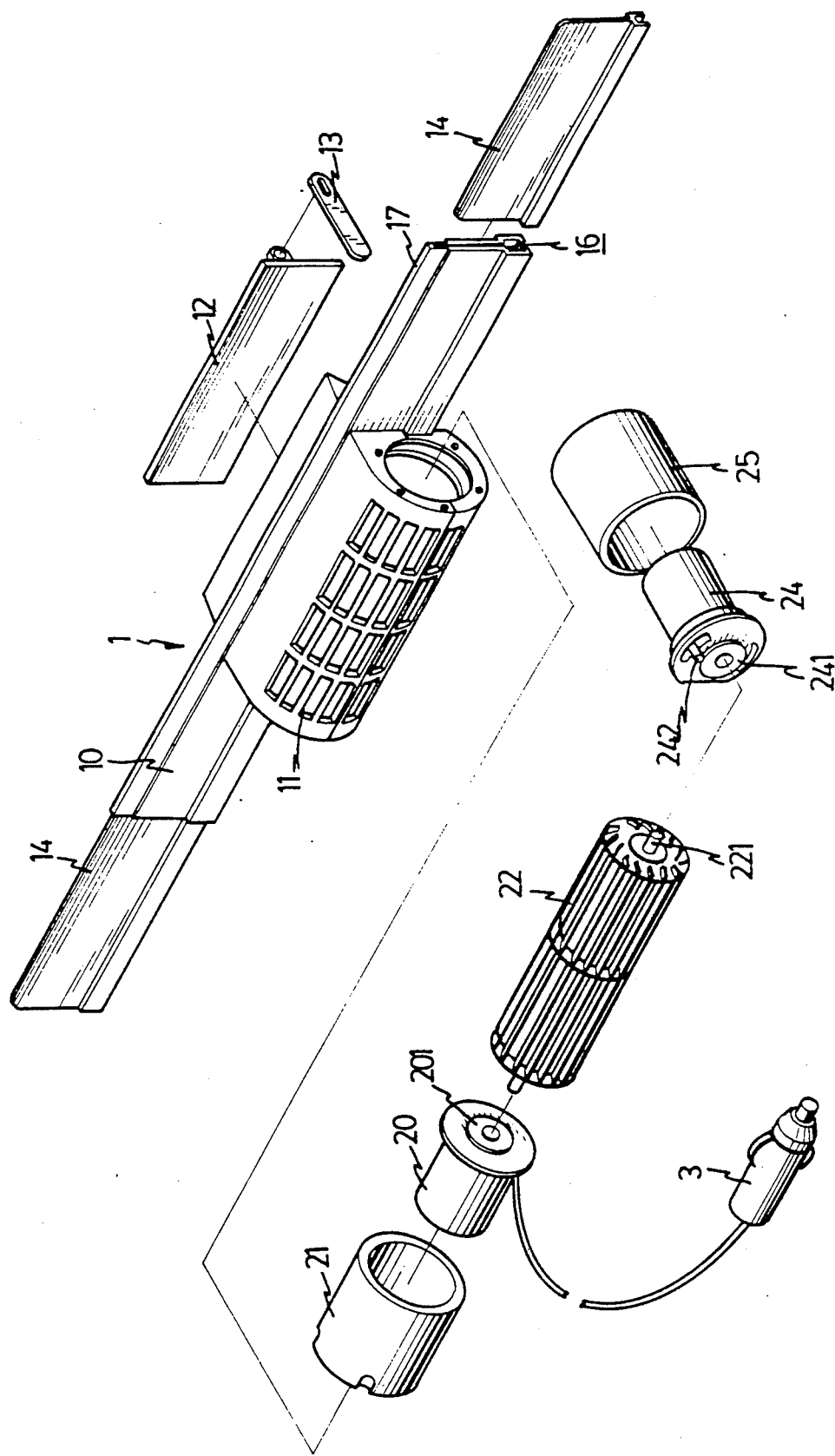
FIG. 2 is an exploded view of the car window fan assembly of FIG. 1.

With reference to the drawings, and initially with reference to FIG. 1 and 2, it can be understood that a car window fan assembly in accordance with the present invention comprises the combination of a window prop 10, an impeller motor 20, a vent lid motor 24, an impeller 22, an impeller housing 11, two extension pieces 14, a vent lid 12 and an activation arm 13.

The window prop 10 is substantially rectangular and rigid. At the upper end of the window prop 10 is a door insert 17 which can be frictionally engaged with a car window frame when desired by the user. The impeller housing 11 is centrally fixed on the window prop 10 and two slideways 16 are positioned on respective distal sides thereof. Each of the slideways 16 slideably receives a respective extension piece 14 therein for extending the length of the window prop 10 as may be required for cars with larger door windows.

Now particularly referring to FIG. 2, it can be seen that the impeller motor 20 and a motor housing 21 are fixed onto one end of the impeller housing 11. The impeller motor 20 has an axle mount 201 thereon. Likewise, the vent lid motor 24 and vent lid motor housing 25 are fixed onto a second end of the impeller housing 11, with the vent lid motor 24 having an axle mount 241 thereon. When activated by the user, the vent lid motor 24 drives a pin 242 to traverse a small arc, thereby driving the activation arm 13 and in turn opening or closing the vent lid 12, which is pivotally connected thereto.

The impeller 22 has an axle 221 which is rotatably supported by the previously mentioned axle mounts (201 and 241). When activated, the impeller motor 20 drives the impeller 22 to rotate.

The cigarette lighter plug 3 is electrically connected to the impeller motor 20 and the vent lid motor 24 so as to activate the motors (20 and 24) when plugged into a car cigarette lighter socket.

Figure 3:
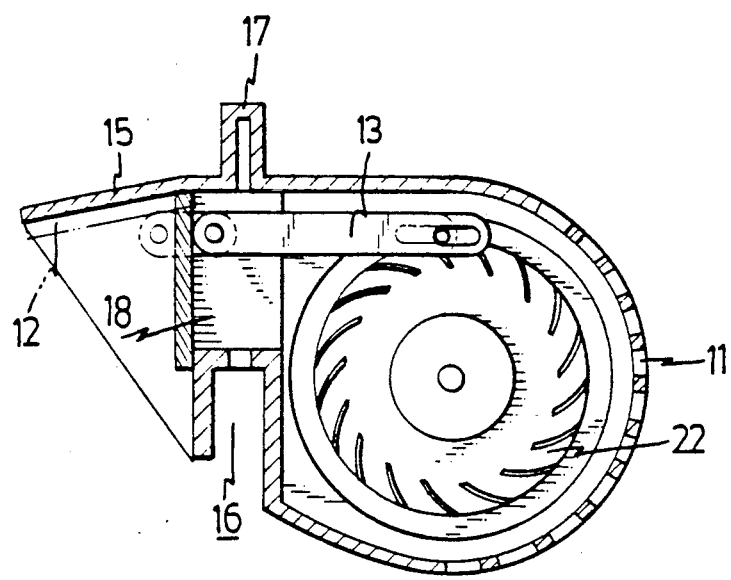
FIG. 3 is a cross-sectional view of the car window fan assembly of FIG. 1, as seen from line III—III of FIG. 1.

As can be seen from FIG. 3, the rain cover 15 is positioned on the window prop 10 opposite the impeller housing 11. A ventilation duct 18 is formed between the rain cover 15 and the impeller 22, with a vent lid 12 being pivotally fixed proximate to an upper end of the ventilation duct 18. When the vent lid motor 24 is activated, the vent lid is driven to open or close the ventilation duct 18 via the activation arm 13, which is mechanically linked to a pin 242 of said vent lid motor 24. Simultaneously, the impeller 22 is rotated by the impeller motor 20, thereby drawing air in from the ventilation duct 18 and exhausting it into the user's car (or other enclosed vehicle).

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as shall fall within the scope of the appended claims.

I claim:

1. A car window fan assembly comprising the combination of:
    (a) a substantially rectangular rigid window prop (10) having a door insert (17) at an upper end thereof which frictionally engages with a car window frame, an impeller housing (11) centrally fixed on said window prop (10) and two slideways (16) which are positioned on respective distal sides of said impeller housing (11), each of said slideways (16) slideably receiving a respective extension piece (14) therein for extending a length of said window prop (10);
    (b) an impeller motor (20) and a motor housing (21) which are fixed onto one end of said impeller housing (11), said impeller motor (20) having an axle mount (201) thereon;

(c) a vent lid motor (24) and vent lid motor housing (25) which are fixed onto a second end of said impeller housing (11), said vent lid motor (24) driving a pin (242) to traverse a small arc, said vent lid motor (24) having an axle mount (241) thereon;

(d) an impeller (22) having an axle (221) which is rotatably supported by said axle mounts (201 and 241); said impeller motor (20) driving said impeller (22) to rotate when activated;

(e) a cigarette lighter plug (3) which is electrically connected to said impeller motor (20) and said vent lid motor (24) so as to activate said motors (20 and 24) when plugged into a car cigarette lighter socket; and (f) a rain cover (15) being positioned on said window prop (10) opposite said impeller housing (11), a ventilation duct (18) being formed between said rain cover (15) and said impeller (22), a vent lid (12) being pivotally fixed proximate to an upper end of said ventilation duct (18), an activation arm (13) hinged to said vent lid (12) and said pin (242), said vent lid (12) being driven to open or close said ventilation duct (18) by said activation arm (13) when said vent lid motor (24) is activated.

* * * * *

UNITED STATES PATENT AND TRADEMARK OFFICE
CERTIFICATE OF CORRECTION

PATENT NO. : 5,044,258

DATED : September 3, 1991

INVENTOR(S) : Shih-Jang WU et al.

Figure 4:
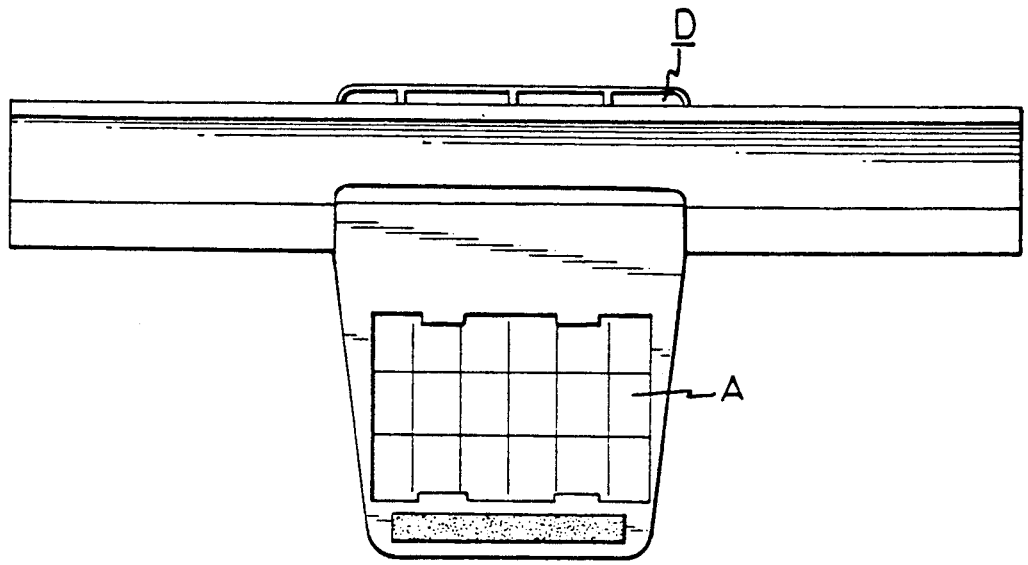
FIG. 4 is a prior art elevational view of a solar-powered car window fan assembly, showing the folded insert plate (B) and the air outlet (C) thereof.
Figure 5:
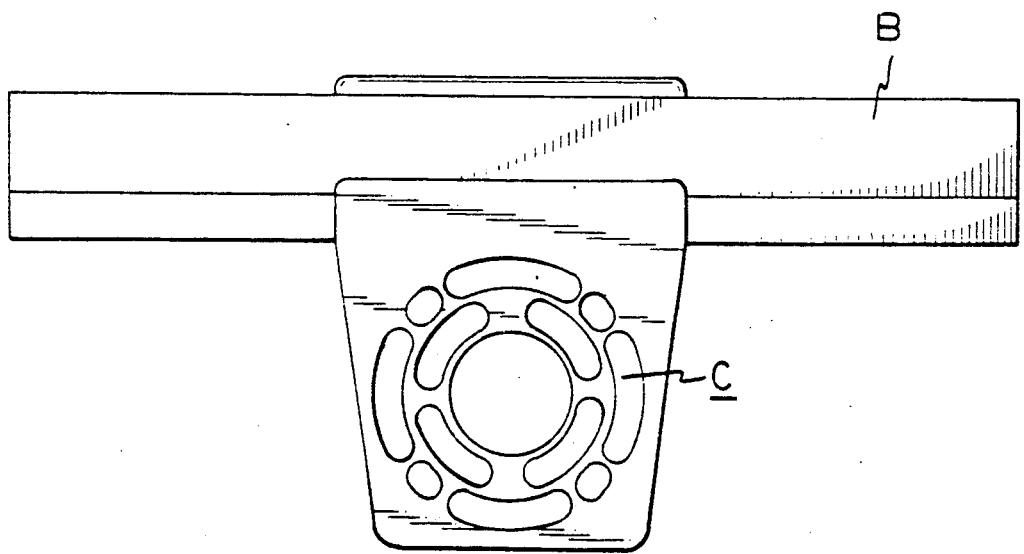
FIG. 5 is a prior art view elevational view of the solar-powered car window fan assembly of FIG. 4, showing the solar panel (A) and air inlet (D), which are on the opposite side from the air outlet.
Figure 5:
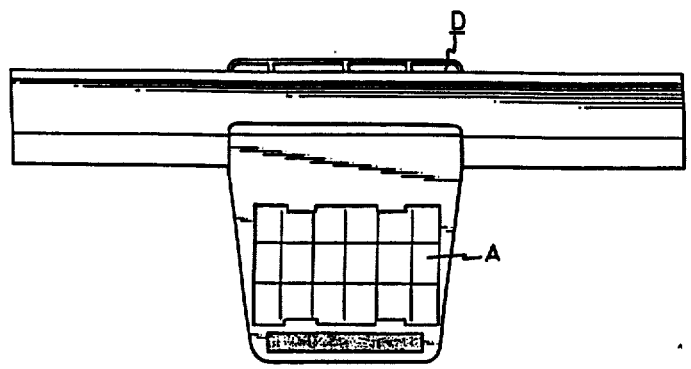
Figure 4:
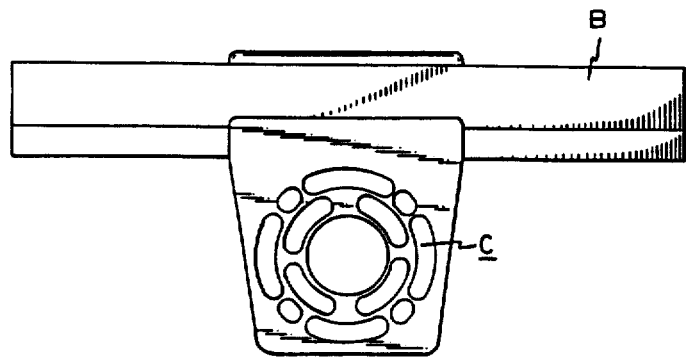

It is certified that error appears in the above-identified patent and that said Letters Patent is hereby corrected as shown below:

IN THE DRAWINGS:

Sheet 4, change "FIG. 4" to --FIG. 5--.

Sheet 4, change "FIG. 5" to --FIG. 4--.

As shown on the attached sheet.

Signed and Sealed this

Twenty-third Day of February, 1993

*Attest:*

STEPHEN G. KUNIN

*Attesting Officer*     *Acting Commissioner of Patents and Trademarks*